(12) United States Patent
Charles et al.

(10) Patent No.: US 10,306,074 B2
(45) Date of Patent: May 28, 2019

(54) SYSTEM AND METHOD FOR GENERATING TELECOM SERVICE ACCESS CREDIT

(71) Applicant: PRIXTEL, Aix En Provence (FR)

(72) Inventors: David Charles, Aix En Provence (FR); Guillaume Tastet, Ventabren (FR)

(73) Assignee: PRIXTEL, Aix En Provence (FR)

( * ) Notice: Subject to any disclaimer, the term of this patent is extended or adjusted under 35 U.S.C. 154(b) by 22 days.

(21) Appl. No.: 15/226,682

(22) Filed: Aug. 2, 2016

(65) Prior Publication Data

US 2018/0041644 A1   Feb. 8, 2018

(51) Int. Cl.
*H04M 11/00*     (2006.01)
*H04M 15/00*     (2006.01)
*G06Q 30/02*     (2012.01)
*H04L 12/14*     (2006.01)

(52) U.S. Cl.
CPC ...... *H04M 15/735* (2013.01); *G06Q 30/0207* (2013.01); *H04M 15/854* (2013.01); *H04L 12/1453* (2013.01); *H04M 15/61* (2013.01); *H04M 15/8221* (2013.01)

(58) Field of Classification Search
None
See application file for complete search history.

(56) References Cited

U.S. PATENT DOCUMENTS

| | | | |
|---|---|---|---|
| 8,606,226 B1* | 12/2013 | Charach | H04M 15/39 455/405 |
| 2008/0057917 A1* | 3/2008 | Oria | H04M 15/00 455/414.1 |
| 2008/0235332 A1* | 9/2008 | McChesney | G06Q 30/02 709/204 |

* cited by examiner

*Primary Examiner* — Suhail Khan
(74) *Attorney, Agent, or Firm* — Womble Bond Dickinson (US) LLP

(57) ABSTRACT

A method for accessing telecommunications services (124-126) from a terminal (110-112, 140-142) having credit-based communications capabilities. The method includes consuming credit when accessing telecommunications services, when available communications credit value becomes lower than a predefined threshold, providing to a user of said terminal a action selection user interface enabling the selection of a credit-generating action by the user, and after the action has been executed, recharging communications credit for the user. The present invention also provides a system for implementing the method.

26 Claims, 6 Drawing Sheets

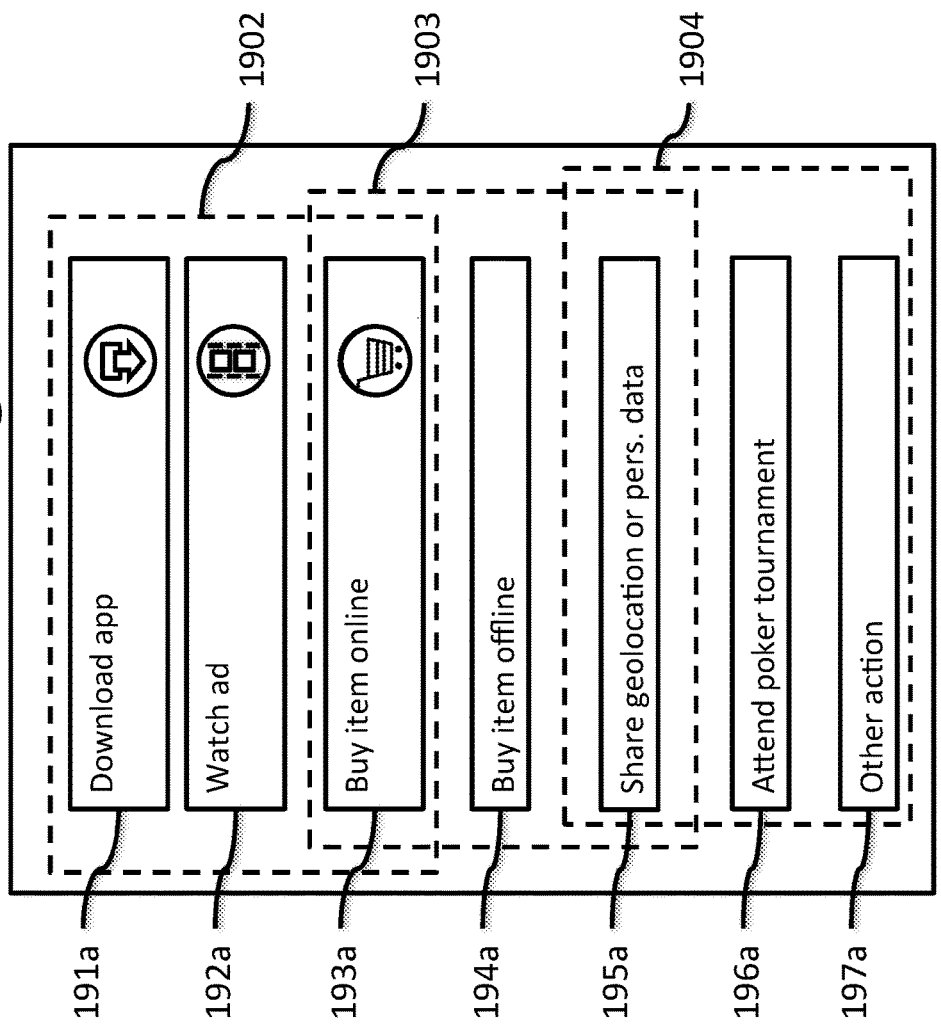

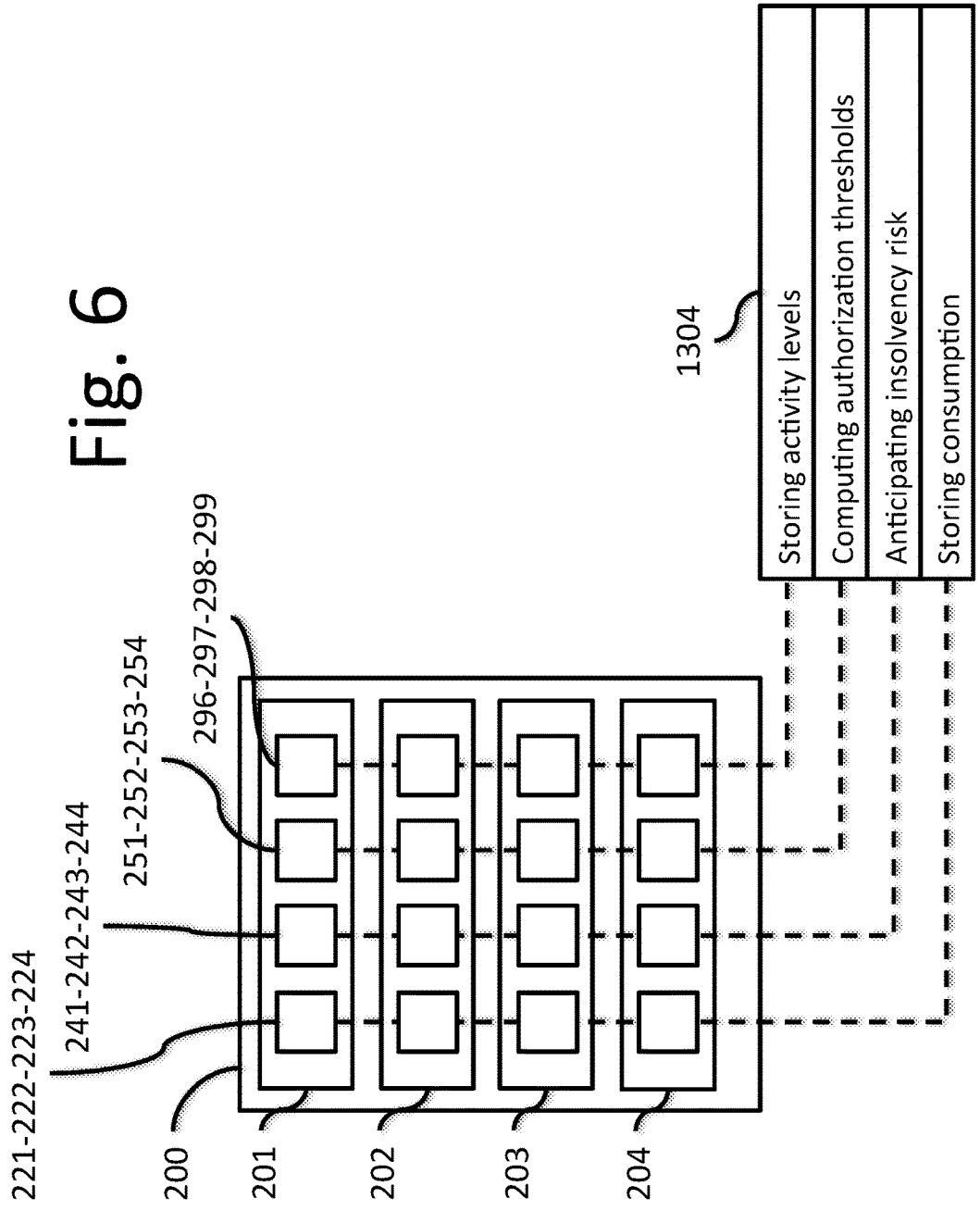

SYSTEM AND METHOD FOR GENERATING TELECOM SERVICE ACCESS CREDIT

FIELD OF THE INVENTION

This invention generally relates to telecommunications services. It relates more particularly to certain techniques for controlling access to such services.

BACKGROUND OF THE INVENTION

Conventionally, a telephone service operator provides an unrestricted access by clients to voice telephone services, and shuts the service when the clients ceases to pay its invoices for the services. Since around a decade, mobile telephone service operators provide communications quota included in a package of services.

Whatever the commercial offer is, it can happen that clients are temporarily insolvable, and this causes a financial loss for the operator as well as an inhibition of the access to the telecom services, which in turn causes client dissatisfaction.

In order to limit the situations of insolvency, a known solution consists in:
either refusing potentially insolvent client when they apply for a subscription,
or obtaining a security for them,
or else obtaining a pre-payment for a credit allowing to use the services until the credit is exhausted.

Besides, many "over the top" (OTT) communications applications have been developed over the recent years such as Skype®, Go-Text.Me®, Twitter® ou Whatsapp®. However, they all require specific identifiers and a separate subscription to a telecommunications service (cell phone subscription including data service, DSL home subscription, etc.). Such identifiers are thus not compatible with the calling numbers of the conventional telecom operators, including a country code followed by a number of digits.

SUMMARY OF THE INVENTION

In such context, an object of the present invention is to provide a solution permitting access by a client to telecommunications services despite his/her pre-paid credit being exhausted, or despite exceeding his/her insolvency risk beyond a threshold acceptable to the operator. Another aim is to provide a solution which is compatible with the conventional telecom operator numbering schemes and is autonomous.

To this end, the present invention provides according to a first aspect a method for accessing telecommunications services from a terminal having credit-based communications capabilities, comprising the following steps,
consuming credit when accessing telecommunications services,
when available communications credit value becomes lower than a predefined threshold, providing to a user of said terminal a action selection user interface enabling the selection of a credit-generating action by said user, and
after said action has been executed, recharging communications credit for said user.

According to a second aspect, the present invention provides a telecommunications system comprising a switching telecommunications network, a plurality of terminals that can selectively connect to each other and to data channels through said network, and an operator platform capable of providing to said network credit-based provisionings for such connections, for respective terminal users, the system further comprising a credit generation subsystem comprising an interconnection between the operator platform and the terminal, said interconnection ensuring that:
when available communications credit value becomes lower than a predefined threshold, providing to a user of said terminal a action selection user interface enabling the selection of a credit-generating action by said user, and
after said action has been executed, recharging communications credit for said user.

Preferred but non-limiting aspects of the above method and system are as follows:
said action selection user interface provides capability of selection among at least two types of actions.
said action selection user interface provides capability of selection among different groups of actions for successive selections of credit-generating actions.
the actions in the different groups are determined at least in part from a learning of selected actions for a given user.
the actions in the different groups of actions are determined at least in part according to their credit generation capacity.
the actions in the different groups of actions are determined at least in part randomly.
different communication credits are provided respectively for different communications services and can be recharged independently from each other.
said predetermined threshold for a given user is determined from a measured activity level at the terminal of said user.
said predetermined threshold for a given user is determined from an insolvency risk value for said user.
different predefined thresholds are determined for different telecommunications services.
said credit generating action(s) is/are selected from a group of action types comprising downloading an application, watching an advertisement video, making an online purchase, making an purchase in a nearby shop, authorizing geolocation by a third party, participating to a contest or game, communicating one's contact data, subscribing to a newsletter, accepting to receive ads, liking a Web page and answering a poll.
said telecommunications services comprise at least two among voice cellular communications, SMS, MMS or data communications.
prior to providing action selection user interface, warning information is provided to said user.

BRIEF DESCRIPTION OF THE DRAWINGS

Other aims, features and advantages of the present invention will appear more clearly from the following description of a preferred embodiment thereof, given by way of non-limiting example and with reference to the appended drawings, in which:

FIG. 5 illustrates an action selection user interface on the user terminal, and FIG. 6 shows the basic principles of a community learning method that can be used in the present invention.

DETAILED DESCRIPTION OF A PREFERRED EMBODIMENT

A method and system for generating access credit to telecommunications services will now be described.

1) Overall System Description

Figure 1:
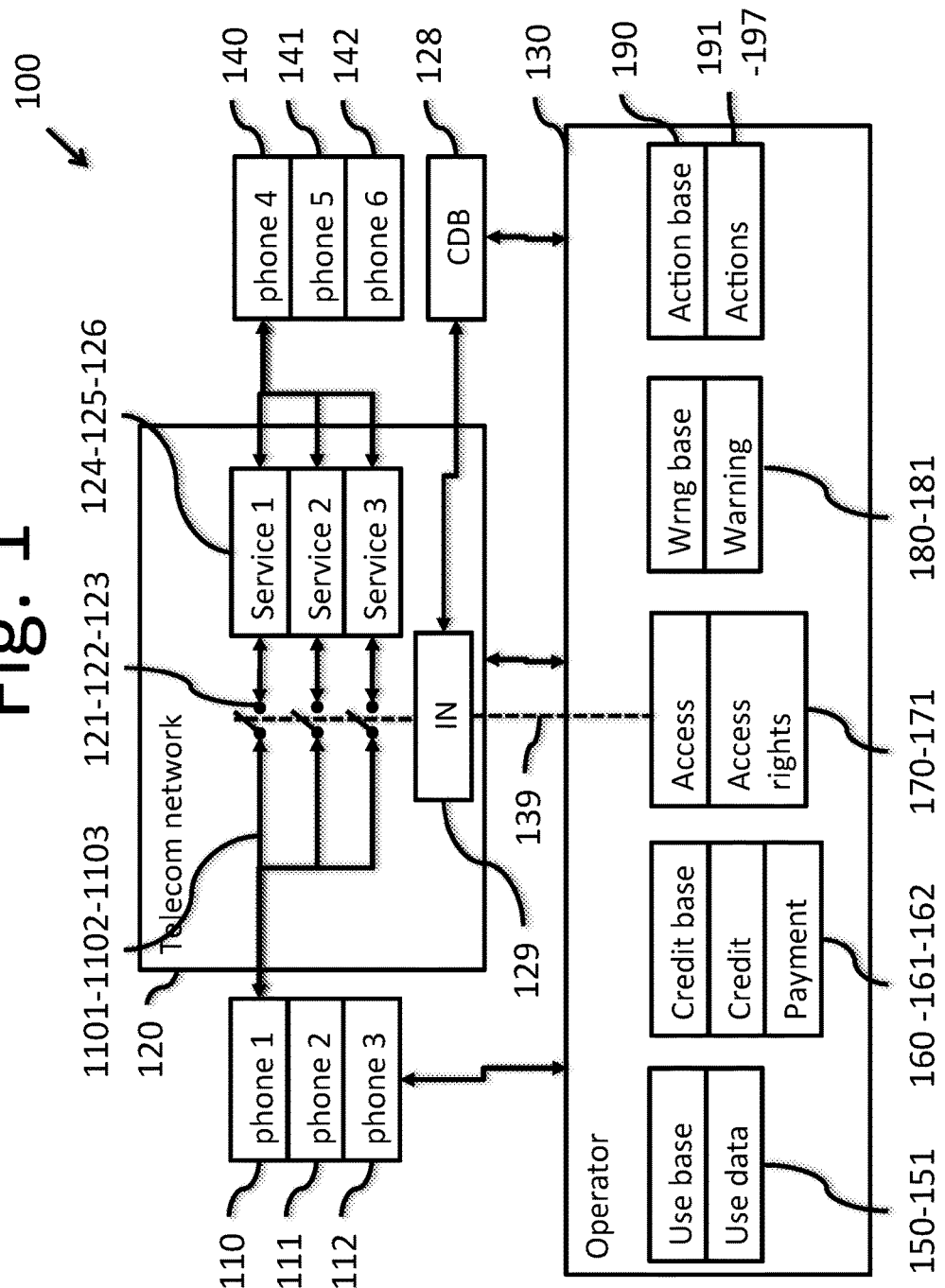
FIG. 1 is an functional overview of a telecommunications system for implementing the present invention.

Referring to FIG. 1, a computerized system for implementing the present invention comprises a set of telecommunications terminals 110-112 and 140-142 such as landline or cell phones, tablets or personal computers, each capable of connecting to a telecommunications network 120 itself driven by the technical platform 130 of a telecommunications operator.

Figure 3:
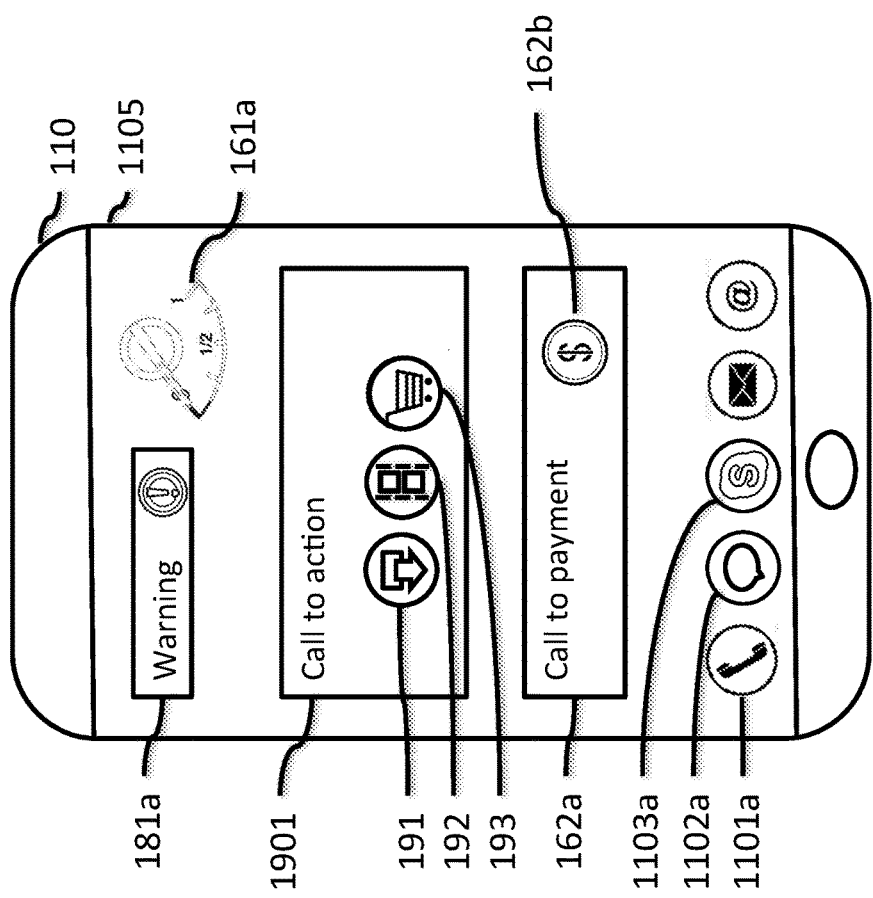
FIG. 3 illustrates a user interface on a user terminal of the above system.

Referring to FIG. 3, a user can apply a telecom service request by means of his/her terminal 110 via a user interface 1105, this request involving a number of communications parameters, including a communications type, symbols for different types such as voice communications 1101a, SMS communications 1102a or data communications 1103a (in this case data-based voice or video communications) being illustrated in FIG. 3.

2) Telecommunications Network

Back to FIG. 1, the telecommunications network 120 typically is a direct routing telecom network comprising a hardware and software infrastructure for landline and mobile telecommunication, such as a Public Land Mobile Network (PLMN) that includes four subsystems:

- radio layer: a Base Station Subsystem (BSS) allows cell phones to connect to Base Transceiver Station (BTS) antennas, the BTS being in turn connected to respective Base Station Controllers (BSC) (all not shown);
- network layer: a Network SubSystem (NSS) allows grouping BSCs in mobile-services switching centers (MSC) acting as routing servers; these routing servers are connected to visitor location registers (VLR) and home location registers (HLR) (all not shown);
- management and maintenance: an operation support subsystem (OSS), not shown, allows an overall control when a connection is established. The major roles of an OSS are fault management, configuration management, performance management and inventory management;
- telecom services: the network provides a number of services (Service 1, Service 2, Service 3, etc. such voice communications 124, SMS communications 125, data communications 126, etc. between terminals 110-112 one the one hand and 140-142 on the other hand.

The network is characterized by the access to a central database (CDB) 128 and the integration of an intelligent network (IN) 129. More particularly:

- in the central database 128, mobile number portability (MNP) enables mobile telephone users to retain their mobile telephone number when changing from one service provider to another; in direct routing, the central database (sometimes called central clearing house) handles all activities related to porting of subscribers between special management modules of service providers; this model is suited for markets with several service providers and is currently used in almost all MNP implementations;
- the Intelligent Network 129 is a telephone network architecture which contains service logic for calls, located separately from the switching facilities and allowing services to be added or changed without the need of redesigning switching equipment; IN 129 further allows a telecom operator 130 to size and book telecom service resources in real time; IN 129 accesses the CDB database 128 to manage the number portability of terminals 110-112 and 140-142.

c) Provisioning

The telecom network 120 manages requests 1101-1102-1103 for accesses to telecom services 124-126. These accesses are symbolized in FIG. 1 by switches 121-123 and result from provisioning actions 139 performed in operator platform 130 and processed in the intelligent network 129, in a manner well known to the skilled artisan.

Provisioning refers to the setting up of new services, such as GPRS, MMS and Instant Messaging, for an existing subscriber of a mobile phone network, and any gateways to standard Internet chat or mail services. A general example of provisioning is for data services. A mobile user who is using his or her device for voice calling may wish to switch to data services in order to read emails or browse the Internet. The mobile device's services are "provisioned" and thus the user can stay connected through push emails and other features of smartphone services.

d) Operator Platform

Referring again to FIG. 1, the telecom operator platform 130 controls the telecom network 120. Platform 130 authorizes access to telecom services 124-126 between terminals 110-112 and 140-142 by actuating switches 121-123 in response to provisioning actions. The various sub-systems of this platform will be described in the following.

e) Learning Module

This module relies on different data as inputs.

Figure 2:
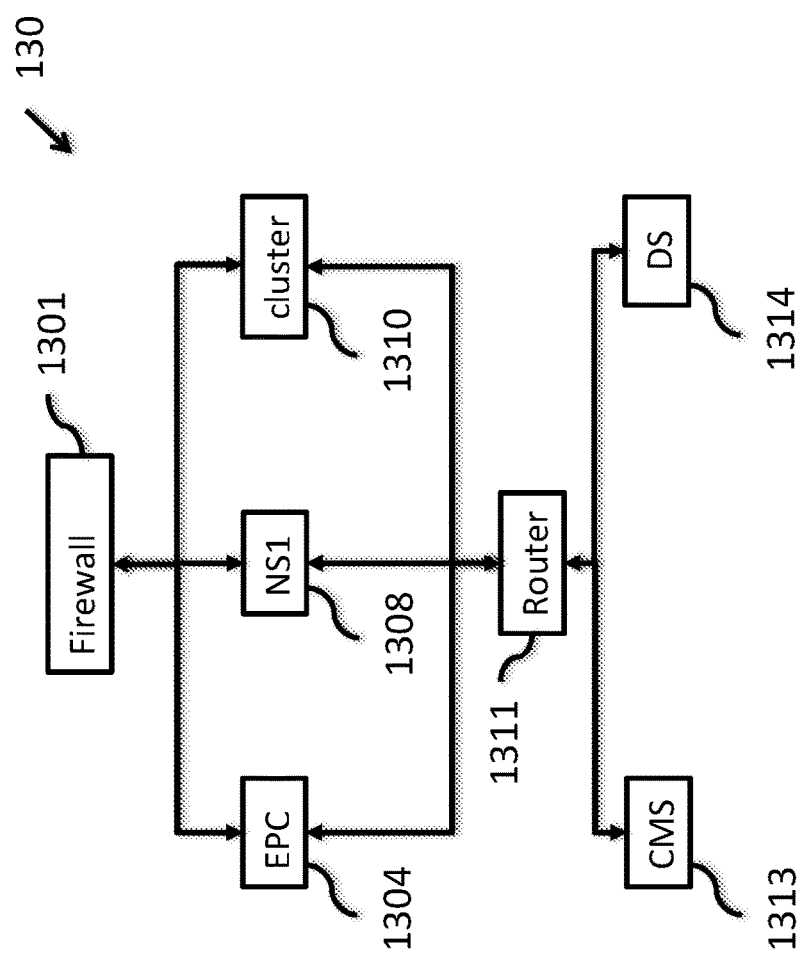
FIG. 2 is an overview of the architecture of an operator platform of the system.

In summary, these data include:

- use data 150 generated by means of a use learning module of a services management server 1304 illustrated in FIG. 2 (cf. infra); these data include respective voice, SMS, MMS and internet consumption data as well as a consumption level value.
- credit data 160 comprising a use credit value 161 for using services 124-126 and payment request and invoicing data 162.
- access right data 170 for accessing telecom services 124-126 depend on the relationship between use credit value 161 and authorization thresholds 1701-1703.
- a warning database 180 containing warning data 110 for user terminal such as user terminal 110.
- an action database 190 storing action data including action types 191-197 representative of a number of actions that can be performed by a user at a terminal 110 within the framework of an affiliate program of the operator of platform 130; an affiliate program is an automated electronic program that involves a Web advertiser and recruited webmasters; affiliate marketing is a type of performance-based marketing in which a business rewards one or more affiliates for each visitor or customer brought by the affiliate's own marketing efforts. For example, Amazon.Com® (which sells books, electronics, pharmaceuticals, toys, and many other items) has thousands of affiliated interest specific web-sites from where the visitors can reach products offered by Amazon; the entire sales transaction takes place at Amazon's website which is equipped to handle the complete online payment acceptance process. Amazon passes on a percentage of the sold item's price as commission to the affiliate website from where the sale originated (business Dictionary®); the market has grown in complexity, resulting in the emergence of more players: the merchant (also known as 'retailer' or 'brand'), the publisher (also known as 'the affiliate'), the customer, the network and affiliate management agencies like Zanox®, Supersonic.Com®, surveysampling.Com®, Opinionrewardsclub®, Clyce® or Appnext®.

Depending on the advertisers and affiliation management agencies, there can be various action types 191-197 proposed to users. Actions database 190 thus contains the following action types: downloading an application (type 191), watching an advertisement video (type 192), making an online purchase (type 193), making an purchase in a nearby shop (type 194), authorizing geolocation by a third party (type 195), participating to a contest or game such as a poker tournament (type 196), communicating one's contact data (type 197), subscribing to a newsletter, accepting to receive ads, liking a Web page, answering a poll, etc.

f) Details of Operator Platform

Referring to both FIG. 1 and FIG. 2, the telecom operator platform 130 comprises the following computer servers, capable of cooperating with each other:
- a firewall 1301,
- the above-mentioned services management server 1304 comprising:
    - a module for managing the relations with CDB 128; this module cooperates with CDB 128 to ensure calling number portability;
    - a module for managing call detail records (CDR): a call detail record (CDR) is a data record generated by intelligent network 129 that documents the details of a telephone call or other communications transaction (e.g., text message) that passes through that facility or device. The record contains various attributes of the call, such as time, duration, completion status, source number, and destination number;
    - a consumption control module that manages user consumption credit database 160; this module increases the consumption credit 161 for a given user 110 when the latter makes a payment or executes an action (cf. infra); the module decreases credit 161 for a given user in accordance with use data 151 representative of the use of telecommunication services 124-126 by his/her terminal 110;
    - an access management module that computes and manages authorization thresholds and access rights 170 in accordance with the use credit value 161, a user insolvency risk and a user activity level; in the case where the authorization thresholds are established from statistics computed by an alert (or warning) management module as described below, the module is parameterized with at least a first set and a second set of predefined thresholds; module is embodied for instance by an access control program such as open-NAC® (open Network Access Control):
    - An alert management module that computes and manages an alert database 180 and the generation of alerts 181; this module cooperates with a system for unpaid invoice prevention, such as the commercially available Preventel® system capable providing an insolvency risk of a given user via an interface, and further cooperates with the use learning module and the consumption control module which provide the use database 150 and the consumption credit database 160; module 180 is parameterized with one or several predefined alert thresholds; module 180 also implements a customer segmentation based on machine learning, such as the system commercially known as Scikit-Learn®, so as to establish statistics based on data from an insolvency risk database, from consumption level data and activity levels; based on these data, module generates alerts 181 and transmit such alerts via SMS, email or notification to a user terminal;
    - a provisioning module, that generates provisioning data 139 and transmits them from platform 130 to the telecom network 120;
    - interfaces with third party FTP servers;
    - an action management module that computes and manages calls for action (cf. infra); module relies on a database of actions 190 that can be executed by user and generates a succession of action sets, initially in a random manner and then as a function of actions selected by user in a previous set: module cooperates for this purpose with an action learning module that will be described in the following;
    - a use learning module that establishes use database 150 containing use data 151 for respective users; for this purpose, this module cooperates with a call record management module for fixed-line and DSL communications and a call record management module for GSM communications;
    - an action learning module that computes and manages the leaning of actions in database 190 in particular by logging observed activity levels, time stamping of executed steps and action selections by users;
    - an affiliation management module that manages the information traffic interexchange with merchant server or affiliation agency, not illustrated, and in particular the transactional flux of the compensation received by operator when a user executes an action;
- a server cluster 1310 comprising:
    - the hosting function for the operator extranet;
    - a payment and invoicing module managing payment data 162, using for that purpose a dedicated program such as Open Cell® available from the Open Cell Software company; this module is further configured to manage online payment for credit recharging from a terminal, according to any of the methods known to the skilled person; for instance, the online payment is made with a credit card, via Paypal®, via a pre-paid card, via a code obtained from a scratch ticket, etc.; the call for payment can be associated with special offers such as free SMS, bonus credit, etc.;
    - the hosting function for the operator's website;
- a name server NS1 1308 having the following functionalities:
    - DNS (Domain Name Server) for the various zones of the operator's website;
    - load distribution for the extranet and website of operator;
- a communications management server 1313 comprising:
    - an interface with telecom network 120, that transmits the provisioning data 139 generated by provisioning module to the intelligent network 129 of telecom network 120 in order to size and provision the telecommunications resources;
- a module for collecting call records in GSM communications,
- an interface with the unpaid invoice prevention system such as Preventel®, in order to read and write data in that system, etc. and manage an insolvency risk database containing insolvency risk information for respective users;

a first data server 1314 containing use database 150, credit database 160, access database 170, alert database 180 and action database 190;

a router 1311;

The management programs of servers 1304, 1308 and 1313 preferably are Open Source Mobile Communication Osmocom®) applications operated on an Ubuntu® platform, hosted by a platform such as Amazon®.

g) User Interface

Referring to FIG. 3, communications terminal 110 is in the present species a smartphone having Internet connectivity and provided with a user interface 1105 preferably based on touch screen an having the following functionalities:

- a series of buttons 1101a-1103a for requesting access to voice communications service 1101, SMS communications service 1102, Internet-based communications service 1103 such as a VoIP or voice+image over IP communications services;
- access to a Web page hosted in a dedicated module of cluster 1310, this page being previously set-up at operator platform 130;
- the display of a gauge symbol 161a indicating the use credit value 161 for user of terminal 110,
- the display of warning information 181a if an alert level 181 is set; this alert 181a is in the present example a text message, the content of which (e.g. "warning, limited credit", "alert, credit exhausted") can be variable and depend on the alert level or remaining credit value 161; this warning information preferably further includes a symbol (e.g. a blinking dot, an exclamation point) displayed with a color (orange, red), depending on the remaining credit value 161;
- in association with the warning information display, the display of a call for payment zone 162a with a call for payment button 162b; the selection of a call for payment with button 162b when selected launches an on-line payment process by credit card or a payment system such as Pay-Pal®, in a manner known to the skilled person;
- the display of a call for action zone 1901 containing a set of action buttons 191a-193a respectively causing execution of a thus selected action 191-193 as will be described in the following, so that when user causes such execution the operator of operator platform 130 receives a financial compensation as an affiliate, according to a method known per se to the skilled person.

h) Access Control Method

Figure 4:
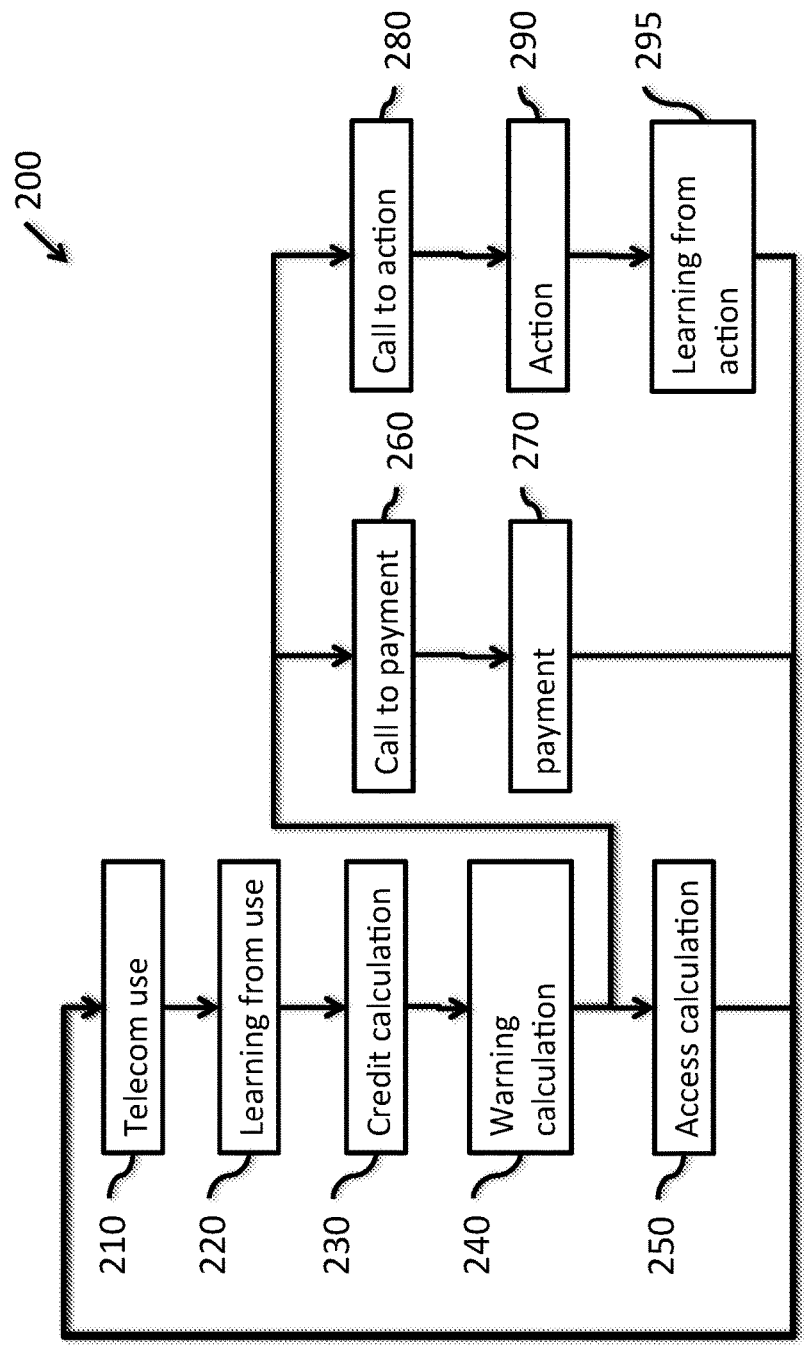
FIG. 4 shows different steps of an access control method implemented in the above system.

Referring to FIG. 4, a preferred method 200 allowing control of the access by a user to telecom services 124-126 will be described.

At step 210, the user provided with a terminal 110 can connect with other terminals 140-142 via telecom network 120 in order to use different telecom services 124-126.

At step 220, the above-described learning module determines use data 151 by user of terminal 110. These use data 151 comprises voice communications consumption data, a number of SMS, a number of MMS, a volume of internet data, as obtained by collecting the call report information as mentioned above. Use learning module further determines a consumption level per unit of time by user of terminal 110 according to the following formula:

Consumption level/time period=(10×voice consumption value+3×number of SMS+5×number of MMS+data volume)/time period At step 230, the consumption control module of services management server 1304 updates the remaining consumption credit value 161 for user 110 as a function of these use data 151.

At step 240, the alert management module 180 determines alert levels 181 and control the display of warning information 181a on terminal 110; alternatively or in addition, a warning message can sent via SMS to terminal 110 if the following condition is true:

User insolvency risk value×consumption level/use credit value 161/activity level>warning threshold At step 250, access management module 170 computes the communications authorization thresholds in the following manner:

voice communications authorization threshold=10× insolvency risk/activity level, SMS communications authorization threshold=insolvency risk/activity level Internet data communications authorization threshold=3×insolvency risk/activity level Access management module 170 then computes the access rights 171 for user 110 by applying the following rules:

- access to service 124 is authorized if credit value 161 is larger than voice communications authorization threshold value,
- access to service 125 is authorized if credit value 161 is larger than SMS communications authorization threshold value,
- access to service 126 is authorized if credit value 161 is larger than data communications authorization threshold value.

Provisioning module establishes provisioning values 139 by duplicating access rights 171.

The operator platform interface transmits the provisioning values 139 to intelligent network 129 of telecom network 120. In FIG. 1, the enabling or disabling of access is symbolized by the closing or opening of a logical switch 121-123, the states of the switches corresponding to the respective access right values.

Step 260 is triggered when an alert level 181, corresponding to a first warning threshold, has been generated at step 240. At step 260, payment and invoicing module generates a call for payment 162 which is displayed on user interface 1105 of terminal 110.

At step 270, consumption control module increases the use credit value 161 of user 110 in proportion to amount paid by said user.

Alternatively to step 260, step 280 is triggered when an alert, corresponding to a second warning threshold, has been generated at step 240. At step 280, action management module performs a call for action, without any call to payment, by causing the display or highlight of action call zone 1901 in accordance with a method described in the following, and displays the call on user interface 1105 of terminal 110.

At step 290, user causes execution of one of the actions proposed by corresponding buttons 191a-193a in action call zone 1901, e.g. the "buy item online" action (button 193a). Affiliation management module then manages the transactional fluxes in order to generate the corresponding financial compensation as affiliate. Consumption control module of services management server increases the use credit value 161 of user of terminal 110 with the credit gain corresponding to a certain fraction, e.g. 80%, of the compensation value.

At step 295, action learning module records the list of actions which have been selected and used by user on terminal 110.

FIG. 5 shows in detail a preferred action selection interface generated by action management module and action learning module at steps 280 and 295 of method 200. According to this embodiment, in a first iteration of method 200:

- at step 280, action management module defines a first set 1902 of three actions (buttons 191a-193a) that module selects randomly in action database 190; in the present example, the three selected actions are:
  - "download app" action (button 191a),
  - "watch ad" action (button 192a),
  - "buy item online" action (button 193a);
- at step 290, user select the "buy item online" action 193 by pressing button 193a;
- at step 295, action learning module stores in register 151 the following data:
  - a first timestamp of the activation of this step,
  - the selection of the "buy item online" action 193 made by user among the three proposed actions,
  - the amount of credit earned by the execution of this action.

In a second iteration of method 200:

- at step 280, action management module defines a second set of actions 1903 comprising the action (button 193a) as stored in register 151 and two new actions (buttons 194a, 195a) randomly selected by the module from action database 190, i.e. in the present example:
  - a "buy item online" action (button 193a),
  - a "buy item offline" action (button 194a),
  - a "share geolocation or personal data" action (button 195a).
- at step 290, user selects "share geolocation or personal data" action 195 by pressing button 195a.
- at step 295, action learning module stores in register 151:
  - a second timestamp of the activation of this step,
  - an identifier of action selected by user among the three proposed actions,
  - the gained credit value earned with the execution of said action 195,
  - a computed activity level for user of terminal 110, said level being computed using the following formula:

user activity level=credit gain/(second timestamp−first timestamp)

During a third iteration of method 200:

- at step 280, action management module defines a third set of actions 1904 by applying the following rules:
  - the action among actions of buttons 193 or 195 stored in register 151, which has generated the higher credit gain or, is integrated into set 1903;
  - the action list is completed with two new actions (buttons 196a, 197a) taken randomly from action database 190.

Step 295 is implemented in a manner similar to the previous iterations. In this manner, the following iterations of method 200 allow defining action sets 1902-1904 that maximize the credit gain 161.

i) Community Learning

FIG. 6 illustrates a learning method based on actions and consumptions by users of terminals 110-112 and 140-142 in an advanced embodiment.

Different users trigger execution of method 200 in as many instances 201-204. In this example, four instances of steps 220, 240, 250 et 295 bear references 221-224, 241-244, 251-254 and 296-299, respectively.

Steps 221-224 cause learning module of server 1304 to store consumption levels in the consumption level database 150 for the respective users.

Steps 296-299, cause action learning module of server 1304 to store activity level values in activity level database 150 for the respective users.

Steps 241-244, cause alert management module of server 1304 to anticipate the insolvency risk evolution by executing the following steps:

- extracting from the insolvency risk database the first centile of the users showing the higher risk;
- identifying the profile {consumption level; activity level} of each user of this first centile;
- computing, for each of the users of the 99 other centiles, the average distance between their profiles (consumption level, activity level) and the profiles of the users in the first centile; this distance is preferably determined by a least square value method;
- identifying, among these other 99 centiles, the N centiles for which the above-defined distance to the first centile is the shortest, with preferably N=2.

Of course, the approach by centiles can as a variant be replaced by an approach with a different number of equal populations, and N can be different from 2.

Alert management module sends a warning message 181 by SMS to terminal 110 of a given user (and/or triggers warning information) according to the following conditional rules:

- this user belongs to the first centile or to the two closest centiles AND his use credit value 161 is higher than 50% of the warning threshold value; or
- this user does not belong to any of these three centiles AND his user credit value 161 is higher than the warning threshold value.

Finally, steps 251-254, cause access management module of server 1304 to compute the communications authorization thresholds according to the following rules:

if this user belongs to this first centile or two any one of the two closest centiles, then:

voice communications authorization threshold=first predefined voice threshold,

SMS communications authorization threshold=First predefined SMS threshold, data communications authorization threshold=first predefined data threshold;

if this user does not belong to any of these three centiles, then:

voice communications authorization threshold=second predefined threshold,

SMS communications authorization threshold=Second predefined threshold, data communications authorization threshold=second predefined threshold 17032.

Of course the present invention is not limited to the embodiments described above and shown in the drawings, but the skilled person will be able to derive therefrom many variants and alternatives.

The invention claimed is:

1. A method for accessing telecommunications services from a terminal having credit-based communications capabilities, said telecommunications services being accessible via a switching telecommunications network comprising a network subsystem connected to home location registers and to a central database ensuring mobile number portability, an intelligent network component controlling network switching, said services being accessed by using telephone numbers according to a conventional telecommunications operator numbering scheme, the method comprising the following steps:
consuming communications credit within said telecommunications network when accessing telecommunications services,
when available communications credit value becomes lower than a predefined threshold, causing an operator platform connected to the intelligent network of said switching telecommunications network via an operator platform interface to provide to a user of said terminal an action selection user interface enabling the selection of a credit-generating action by said user, and
after said action has been executed, recharging a communications credit value stored in said operator platform for said user,
computing access rights by applying predefined rules on said recharged credit value, and
duplicating said access rights and transmitting said access rights as provisioning values to said intelligent network component of said telecommunications network via said operator platform interface.

2. The method according to claim 1, wherein said action selection user interface provides capability of selection among at least two types of actions.

3. The method according to claim 2, wherein said action selection user interface provides capability of selection among different groups of actions for successive selections of credit-generating actions.

4. The method according to claim 3, wherein the actions in the different groups are determined at least in part from a learning of selected actions for a given user.

5. The method according to claim 3, wherein the actions in the different groups of actions are determined at least in part according to their credit generation capacity.

6. The method according to claim 3, wherein the actions in the different groups of actions are determined at least in part randomly.

7. The method according to claim 1, wherein different communication credits are provided respectively for different communications service provisioning and can be recharged independently from each other.

8. The method according to claim 1, wherein said predetermined threshold for a given user is determined from a, activity level at the terminal of said user measured by said operator platform.

9. The method according to claim 1, wherein said predetermined threshold for a given user is determined from an insolvency risk value for said user.

10. The method according to claim 1, wherein different predefined thresholds are determined for different telecommunications services.

11. The method according to claim 1, wherein said credit generating action(s) is/are selected from a group of action types comprising downloading an application, watching an advertisement video, making an online purchase, making an purchase in a nearby shop, authorizing geolocation by a third party, participating to a contest or game, communicating one's contact data, subscribing to a newsletter, accepting to receive ads, liking a Web page and answering a poll.

12. The method according to claim 1, wherein said telecommunications services comprise at least two among voice cellular communications, SMS, MMS or data communications.

13. The method according to claim 1, further comprising causing said operator platform to provide to said user warning information prior to providing action selection user interface.

14. A telecommunications system comprising a switching telecommunications network, a plurality of terminals that selectively connect to each other and to data channels for accessing telecommunications services through said telecommunications network, said telecommunications network comprising a network subsystem connected to home location registers and to a central database ensuring mobile number portability, and an intelligent network component controlling network switching, whereby services are accessed by using telephone numbers according to a conventional telecommunications operator numbering scheme, the system further comprising an operator platform providing to said intelligent network component via an operator platform interface credit-based provisionings for such connections, for respective terminal users, the system further comprising a credit generation subsystem comprising an interconnection between the operator platform and a terminal, said interconnection ensuring that:
when available communications credit value becomes lower than a predefined threshold, a user of said terminal is provided with an action selection user interface enabling the selection of a credit-generating action by said user,
after said action has been executed, a communications credit value for said user is recharged and stored in said operator platform,
access rights are computed by applying predefined rules on said recharged credit value, and
said access rights are duplicated and transmitted as provisioning values to said intelligent network component of said telecommunications network via said operator platform interface.

15. The system according to claim 14, wherein said action selection user interface provides capability of selection among at least two types of actions.

16. The system according to claim 15, wherein said action selection user interface provides capability of selection among different groups of actions for successive selections of credit-generating actions.

17. The system according to claim 16, wherein the actions in the different groups are determined at least in part from a learning of selected actions for a given user.

18. The system according to claim 16, wherein the actions in the different groups of actions are determined at least in part according to their credit generation capacity.

19. The system according to claim 16, wherein the actions in the different groups of actions are determined at least in part randomly.

20. The system according to claim 14, wherein different communication credits are provided respectively for different communications services and can be recharged by said operator platform and transmitted to said telecommunications network independently from each other.

21. The system according to claim 14, wherein said predetermined threshold for a given user is determined from an activity level at the terminal of said user, measured by said operator platform.

22. The system according to claim 14, wherein said predetermined threshold for a given user is determined from an insolvency risk value for said user.

23. The system according to claim 14, wherein different predefined thresholds are determined for different telecommunications services.

24. The system according to claim 14, wherein said credit generating action(s) is/are selected from a group of action types comprising downloading an application, watching an advertisement video, making an online purchase, making an purchase in a nearby shop, authorizing geolocation by a third party, participating to a contest or game, communicating one's contact data, subscribing to a newsletter, accepting to receive ads, liking a Web page and answering a poll.

25. The system according to claim 14, wherein said telecommunications services comprise at least two among voice cellular communications, SMS, MMS or data communications.

26. The system according to claim 14, further comprising a warning module in said operator platform for providing to said user warning information prior to providing action selection user interface.

* * * * *